United States Patent
Dull et al.

(10) Patent No.: US 8,079,606 B2
(45) Date of Patent: Dec. 20, 2011

(54) TROLLEY WITH A SWIVABLE GUIDE WHEEL

(75) Inventors: Graham Dull, Dubbo (AU); Clinton Anthony Dull, Maryland (AU); Mathew Keith Trainor, Mont Albert (AU)

(73) Assignee: Inautec Pty Limited, Cooranbong, New South Wales (AU)

( * ) Notice: Subject to any disclaimer, the term of this patent is extended or adjusted under 35 U.S.C. 154(b) by 713 days.

(21) Appl. No.: 11/579,544

(22) PCT Filed: May 3, 2005

(86) PCT No.: PCT/AU2005/000631
§ 371 (c)(1),
(2), (4) Date: Oct. 20, 2008

(87) PCT Pub. No.: WO2005/105539
PCT Pub. Date: Nov. 10, 2005

(65) Prior Publication Data
US 2009/0206565 A1 Aug. 20, 2009

(30) Foreign Application Priority Data

May 3, 2004 (AU) .................................. 2004902305
Jul. 30, 2004 (AU) .................................. 2004904302

(51) Int. Cl.
*B62B 7/00* (2006.01)
(52) U.S. Cl. .................... 280/47.39; 280/47.38; 16/35 R
(58) Field of Classification Search ................. 280/43.2, 280/47.2, 47.23, 47.25, 47.29, 47.32, 47.35, 280/47.371, 47.38, 79.11, 47.39; 16/35 R, 16/35 D, 21, 36, 31 R; 188/1.12, 29
See application file for complete search history.

(56) References Cited

U.S. PATENT DOCUMENTS

| | | | | |
|---|---|---|---|---|
| 2,709,828 A * | 6/1955 | Noelting et al. | ............... | 16/35 R |
| 2,972,163 A * | 2/1961 | Ross et al. | ..................... | 16/35 R |
| 3,162,888 A * | 12/1964 | Mobus | .......................... | 16/35 R |
| 3,571,842 A * | 3/1971 | Fricke | .......................... | 16/35 R |
| 3,828,392 A * | 8/1974 | Bolger | .......................... | 16/35 R |
| 3,890,669 A * | 6/1975 | Reinhards | ...................... | 16/35 R |
| 4,035,864 A * | 7/1977 | Schroder | ....................... | 16/35 R |
| 4,205,413 A * | 6/1980 | Collignon et al. | ............ | 16/35 D |
| 4,248,445 A * | 2/1981 | Vassar | ......................... | 280/79.11 |
| 4,348,784 A * | 9/1982 | Fontana | ............................ | 16/36 |
| 4,349,937 A * | 9/1982 | Fontana | ........................ | 16/35 R |
| 4,706,328 A * | 11/1987 | Broeske | ........................ | 16/35 R |

(Continued)

FOREIGN PATENT DOCUMENTS

EP 0370716 A1 5/1990

(Continued)

*Primary Examiner* — Hau Phan
(74) *Attorney, Agent, or Firm* — Miles & Stockbridge P.C.

(57) ABSTRACT

A castor wheel assembly on the underside of a shopping trolley comprises a wheel mounted to a wheel mount and rotatable about its rotational axis. A locking device including an engagement element and an actuator element is operatively coupled to the wheel mount for releasably engaging a locking element of the wheel mount to restrict swivelling of the wheel about a swivel axis of the wheel mount. The wheel is freely rotatable about the swivel axis when reversely rotated. Reverse rotation of the wheel urges the actuator element into pressing engagement with the wheel, driving the coupling portion of the engagement element away from the periphery of the wheel for disengagement of the engagement element from the locking element. Engagement of the engagement element and the locking element is only effected when the wheel is forwardly rotated to reduce the pressing engagement.

24 Claims, 14 Drawing Sheets

U.S. PATENT DOCUMENTS

| | | | |
|---|---|---|---|
| 4,826,186 A | 5/1989 | Hagelin | |
| 4,835,815 A * | 6/1989 | Mellwig et al. | 16/35 R |
| 4,870,715 A * | 10/1989 | Schnuell | 16/35 R |
| 5,263,226 A * | 11/1993 | Roy et al. | 16/35 R |
| 5,390,393 A * | 2/1995 | Reppert et al. | 16/21 |
| 5,774,936 A * | 7/1998 | Vetter | 16/35 R |
| 6,343,665 B1 | 2/2002 | Eberlein et al. | |
| 6,668,965 B2 * | 12/2003 | Strong | 16/35 R |
| 6,725,501 B2 * | 4/2004 | Harris et al. | 16/35 R |
| 6,865,775 B2 * | 3/2005 | Ganance | 16/35 R |
| 7,159,695 B2 * | 1/2007 | Strong | 188/1.12 |
| 7,810,822 B2 * | 10/2010 | Figel et al. | 280/47.38 |

FOREIGN PATENT DOCUMENTS

| | | |
|---|---|---|
| EP | 0403202 B1 | 12/1990 |
| EP | 0424234 B1 | 4/1991 |
| EP | 0788897 A2 | 8/1997 |
| GB | 2106378 | 4/1983 |
| GB | 2222362 A | 3/1990 |
| GB | 2232386 A | 12/1990 |
| GB | 2 389 084 A | 12/2003 |
| JP | 55156702 | 12/1990 |
| JP | 07-315006 A | 12/1995 |
| JP | 10-166807 A | 6/1998 |
| WO | WO 93/25398 | 12/1993 |
| WO | WO 02/06106 A1 | 1/2002 |

* cited by examiner

TROLLEY WITH A SWIVABLE GUIDE WHEEL

FIELD OF THE INVENTION

The present invention relates broadly to a trolley and to wheel assemblies suitable for being mounted on a trolley.

BACKGROUND OF THE INVENTION

Trolleys with castor wheels are generally heavy and unwieldy to steer and are particularly difficult to control when they are loaded. Manoeuvring a trolley utilising the hand rail provided at the rear of the trolley is no easy task, and involves a certain degree of dexterity and strength from the arm, waist and back of the user.

Users often find themselves in circumstances where they need to change the direction of travel of the trolley frequently such as when manoeuvring a shopping trolley along an aisle in a supermarket. The same applies to trolley beds in hospitals and serving trolleys in restaurants and bars. When turning a trolley from standstill, the user effectively acts as the pivot about which the trolley is moved. As the front castor wheels are relatively distant from the user, a significant torsional force from the waist and lower back of the user is required in order to turn the trolley from standstill or to swing it around from the direction it is pointing. The force required for this is substantially increased when the trolley is loaded. As a result, lower back injuries and muscle strain are relatively common. The resulting muscle pain and discomfort may not be immediate, but may become apparent hours or days after trolley usage. In severe cases, muscle injuries resulting from trolley usage may exacerbate existing muscle or spine injury and in some cases, can be debilitating.

Another awkward situation in which users quite frequently find themselves is when pushing a trolley across a sloping or uneven surface. More specifically, it is not uncommon for a trolley to stall or for the user to lose control of the trolley when the front castor wheels of the trolley are driven into a bump. Trolleys are also inherently susceptible to turning down a sloping surface. In either instance, the user is forced to exert a significant effort in order to maintain the trolley on track. In the latter instance in particular, the user must exert a constant torsional force from their back region to prevent the trolley from turning from the direction of travel while traversing the sloping surface, which again subjects the user to increased risk of back and muscle injury.

The castor wheels of shopping trolleys are also notorious for swivelling from side to side when being pushed over rough surfaces such as often found on footpaths and in supermarket car parks, which besides being an annoyance, impacts deleteriously on the control the user has on the trolley.

Patents and patent applications EP424234 (Guitel Etienne Mobilor), JP10166807 (Nanshin KK), EP0370716 (Herok RJK), WO9325398 (Lloyd Gerald), and GB2389084 (Moye Cyril) describe castors designed to address these problems. The castors described by these patents and patent applications each have a component in frictional contact with the wheel which urges a lock into engagement upon rotation of the wheel in a forward direction, and out of engagement upon rotation in a reverse direction. The lock prevents the castor swivelling.

Although each of these castors can be locked and unlocked they have considerable operational limitations. When the castors' swivel is locked and the locked castors are guiding the trolley a considerable and variable side pressure is applied to the lock. The unlocking force applied to the lock of each of these castors is not necessarily adequate to provide immediate and consistent unlocking in normal operational situations.

Furthermore, the castor of Patent WO9325398 (Lloyd Gerald) enables an operator to unlock the castor swivel by a sideways movement of the trolley. This arrangement has the disadvantage that the castor may be unintentionally unlocked during normal operation. The castors may, for example, be unlocked when a trolley is maneuvered across a slope or steered under load. When using this castor an operator cannot be sure that the swivel will remain locked in all operational situations and allow the guidance wheel to perform appropriately.

Patent JP55156702 (Morita) describes a castor that has considerable disadvantages. A component of the castor that is in frictional contact with the wheel rotates. The rotating component is also in frictional contact with a slide which locks and unlocks the swivel. Because of the frictional contact and relative movement between the rotating component and the sliding component it is almost impossible for them to remain synchronized.

Patent GB2106378 (Morita) also describes a castor which has a component in frictional contact with the wheel. The component brakes the wheel when it rotates in a reverse direction. The braking action of the component pivots a sub-bracket to which the wheel is mounted. This pivotal movement unlocks the swivel. This approach has considerable disadvantages including the number and complexity of the components. Furthermore, because the wheel is mounted to the sub-bracket and not to the castor frame as is normally the case the components of this need to be quite strong.

SUMMARY OF THE INVENTION

In one aspect of the present invention there is provided a wheel assembly comprising:
  a wheel bracket, and a wheel rotationally mounted thereto;
  a swivel shaft, the wheel bracket being mounted to the shaft to swivel, together with the wheel, about the shaft;
  a locking element mounted to the swivel shaft;
  an engagement element arranged for releasable engagement with the locking element to restrict swivelling of the wheel bracket about the swivel shaft; and
  at least one actuator element arranged for contact with a peripheral surface of the wheel and being operatively coupled to a coupling portion of the engagement element whereby rotation of the wheel in one direction only urges the actuator element into pressing engagement with the wheel driving the coupling portion of the engagement element away from the peripheral surface of the wheel for disengagement of the engagement element from the locking element to permit swivelling of the wheel bracket together with the wheel, and rotation of the wheel in another direction reduces said pressing engagement.

Preferably the actuator element is configured for exerting increased pressure on the wheel during rotation of the wheel in said one direction only.

Preferably the engagement element includes an aperture through which the swivel shaft passes, and the engagement element pivots about a pivot axis oriented generally transverse to said shaft.

Preferably the actuator element includes a bearing member clasped or otherwise engaged by the coupling portion of the engagement element distant from the transverse pivot axis.

Preferably the actuator element includes a roller cooperating with a slot of the coupling portion, said slot or opening being distant from the transverse pivot axis.

Preferably the engagement element pivots about the wheel bracket.

Preferably the engagement element is configured to bias into engagement with the locking element.

Preferably also comprising biasing means arranged to bias the engagement element into engagement with the locking element.

Preferably the engagement element has an engagement formation defined at one end region for the engagement with the locking element.

Preferably the actuator element includes a lever member.

Preferably the actuator element includes a roller member.

Preferably the wheel is one of a pair of wheels and said at least one actuator element is a pair of actuator elements being dedicated to respective of the pair of wheels.

Preferably adapted for being fitted to a trolley.

Preferably the trolley is selected from the group consisting of shopping trolleys, bed and cot trolleys, hospital trolleys, trolley carts and wagons, patient lifters and serving trolleys.

The wheel assembly preferably further comprises a drive pin for coupling to the coupling portion of the engagement element and driving the engagement elements about a pivot axis of the engagement element, into and from engagement with the locking element, the at least one actuator being rotatably mounted on the drive pin for driving rotation of the drive pin and thereby the engagement element about the pivot axis in at least one direction with rotation of the actuator element about the drive pin.

The wheel assembly in one preferred form further comprises one or more other engagement elements arranged in side by side relationship relative to each other and said engagement element, said engagement element and the other engagement elements being arranged for releasably engaging the locking element to restrict swivelling of the wheel bracket together with the wheel about the swivel shaft. Preferably the engagement element is swivable about the pivot axis and the engagement of the engagement element with the wheel mount restricts the swivelling of the engagement element and thereby the wheel about the swivel axis.

Preferably the wheel mount comprises a locking element adapted for the releasable engagement with the engagement element, the engagement of the engagement element with the locking element restricting the swivelling of the engagement element about the swivel axis.

Preferably comprising a swivel shaft about which the wheel swivels and defining the swivel axis, the swivel shaft passing through an aperture defined in the locking element and the locking element being rotatable about the swivel shaft within a predetermined limit.

Preferably the predetermined limit is up to about ±12°.

Preferably adapted for being fitted to a trolley.

Preferably the trolley is selected from the group consisting of shopping trolleys, bed and cot trolleys, trolley carts and wagons, patient lifters, and serving trolleys.

In a further aspect of the present invention there is provided a trolley incorporating the wheel assembly for contact with a ground surface for facilitating travel of the trolley. Preferably the trolley is selected from the group consisting of shopping trolleys, bed and cot trolleys, trolley carts and wagons, and serving trolleys.

Preferably the trolley is a shopping trolley, or a bed or cot trolley.

The term "trolley" as used herein is to be taken in its broadest sense and encompasses wheeled carriers which are normally provided with one more castor wheels. Non-limiting examples of trolleys expressly encompassed by the present invention include shopping trolleys, trolley carts and wagons, trolley beds and cots, and serving trolleys.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia or elsewhere before the priority date of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The features and advantages of the present invention will become further apparent from the following detailed description of preferred embodiments together with the accompanying drawings.

DETAILED DESCRIPTION OF PREFERRED EMBODIMENTS OF THE PRESENT INVENTION

Figure 1:
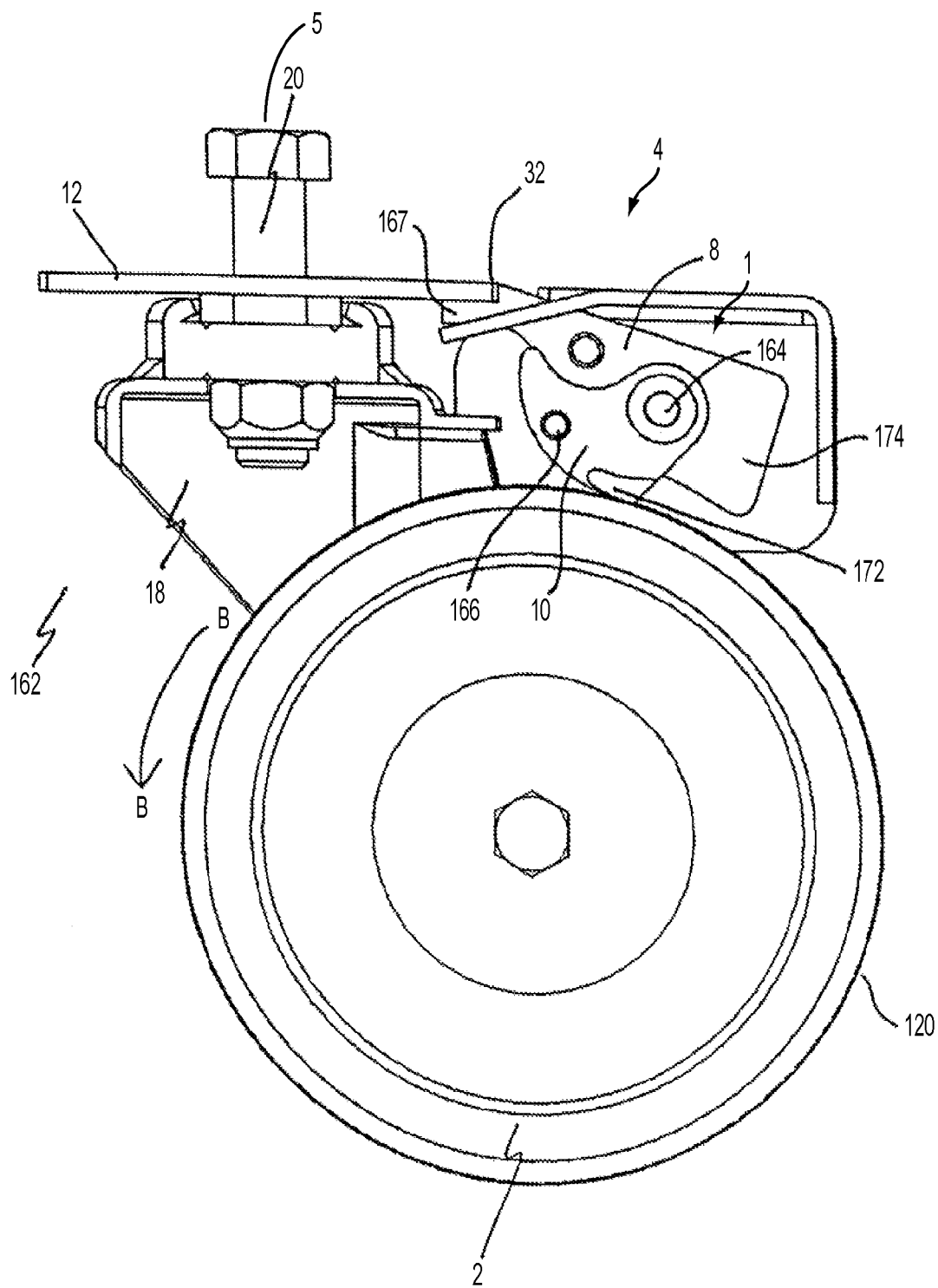
FIG. 1 is a partial side cross-sectional view of a wheel assembly embodied by the present invention when the wheel of the assembly is rotated in the forward direction.

The wheel assembly 1 shown in FIG. 1 is a castor wheel for being fitted onto the underside of the frame of a shopping trolley. The wheel assembly comprises a wheel 2 mounted to a wheel mount 4 and rotatable about its rotational axis 6. Locking means in the form of a pair of engagement elements 8 and an actuator assembly 9 is operatively coupled to the wheel mount 4 for releasably engaging a locking element 12 of the wheel mount 4 to restrict swivelling of the wheel 2 about a swivel axis S of the wheel mount. The engagement of the engagement elements 8 with the locking element 12 is only effected when the wheel 2 is rotated in a forward direction (denoted by B→B) such that the wheel 2 is substantially freely rotatable about the swivel axis when the wheel 2 is rotated in the reverse direction.

The locking element 12 of the wheel mount is in the form of a recessed disk arranged on the swivel shaft 20.

The base 84 of a shopping trolley frame to which a wheel assembly of the invention has been mounted as a fifth castor wheel is shown in FIGS. 2a to 2d. The trolley base is essentially U-shaped in form with side arms 86 and 88 which taper to the front of the trolley base. A pivotally articulated rocker bracket 90 is mounted to the trolley base 84 and pivots about pivots 92 and 94 in the plane of the base. A pair of castor wheels 96 and 98 are mounted on the front end regions of arms 100 and 102 of the rocker bracket 90, one castor wheel on each arm of the rocker bracket, respectively.

Figure 2:
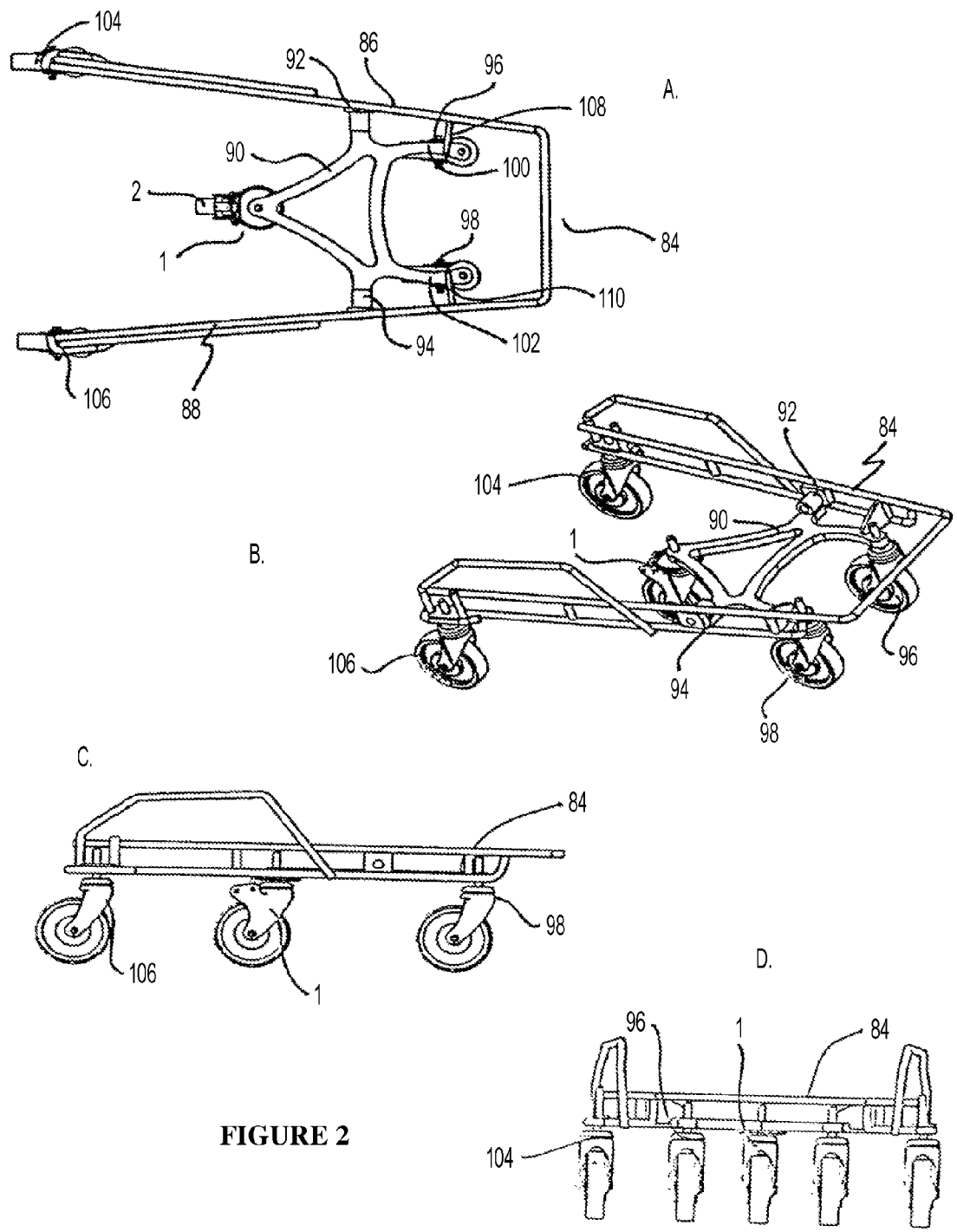
FIGS. 2a-2d show respectively a plan, perspective, side and front end view of a trolley frame onto which the wheel assembly of FIG. 1 is fitted.

The wheel assembly 1 is mounted on the rear end region of the rocker bracket substantially centrally with respect to castor wheels 96 and 98 as indicated in FIGS. 2a and 2d. Further castor wheels 104 and 106 are mounted at the rear of the trolley base 84, one on each side of the trolley. The arrangement is such that the wheel assembly 1 is disposed in a substantially central position between the front and rear castor wheels.

When one or both of the front castor wheels 96 and 98 are driven into a bump in use, the rocker bracket 90 is allowed to pivot a limited degree, typically 5° to 10°, about the trolley base such that the wheel 2 of the wheel assembly 1 is forced downwardly onto the ground surface with travel of the forward castor wheels 96 and 98 over the bump. The rotation of the rocker bracket 90 about the pivots 92 and 94 is limited by stops 108 and 110 on the front end region of the trolley base. By forcing the wheel assembly against the ground surface, contact with the ground is maintained with continued travel of the trolley, and the trolley remains supported at all times. As the wheel 2 of the wheel assembly 1 contacts the bump, the rocker bracket 90 is pivoted in the opposite direction forcing the front castor wheels 96 and 98 downwardly. The pivoting of the rocker bracket about pivots 92 and 94 in the opposite direction is unrestricted by the trolley frame allowing the wheel assembly to readily pass over larger bumps such as floor guards commonly encountered at the top of escalators and the like.

Figure 5:
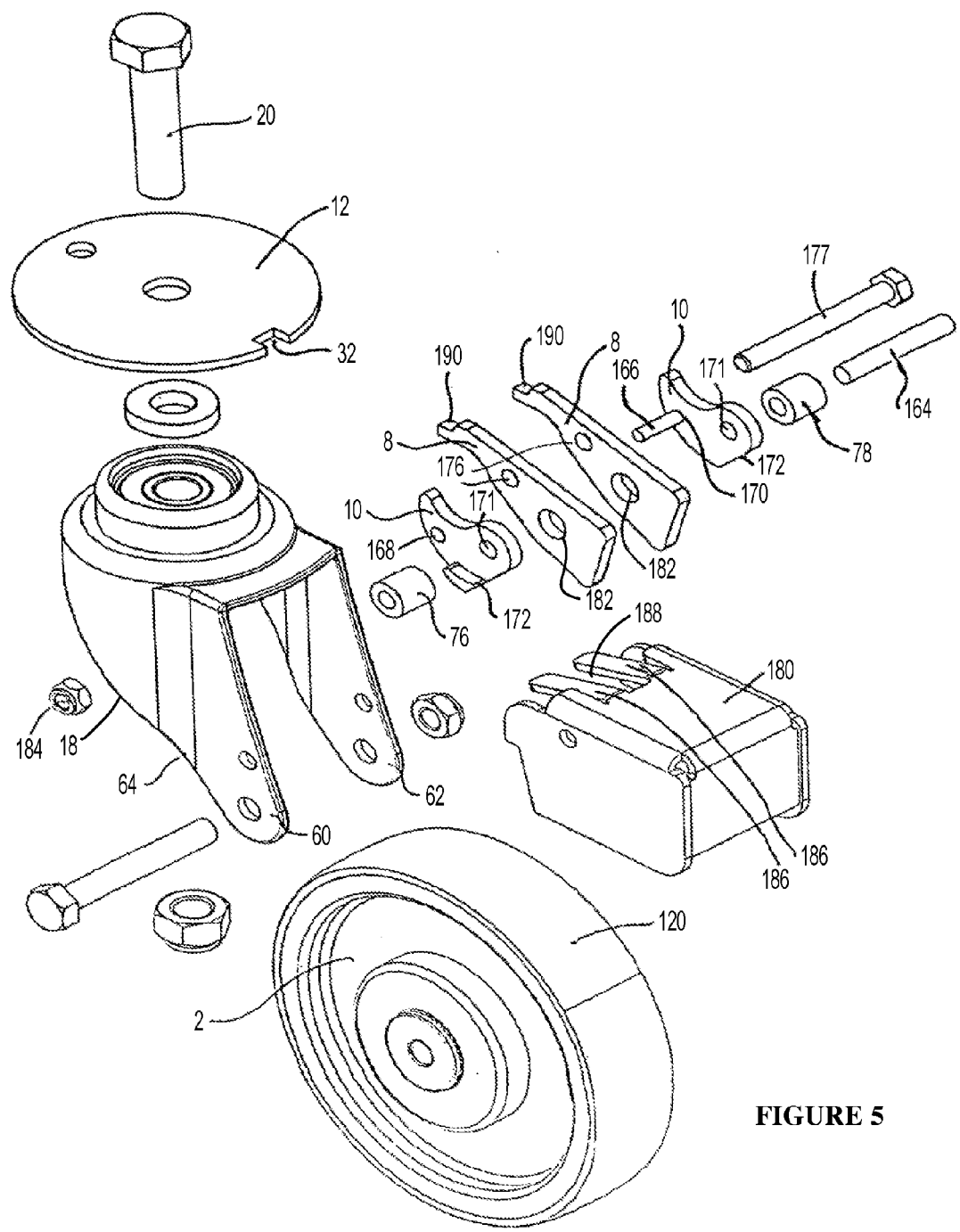
FIG. 5 is an exploded view of the wheel assembly of FIG. 1.

The engagement elements 8 are arranged in a side by side relationship relative to one another between actuator elements 10 of the actuator assembly 9 (see FIG. 5). Apertures 176 of the engagement elements receive a pivot pin in the form of a bolt 177 which extends through the body 64 of the wheel mount from one side to the other and is secured in position by a nut 184. The actuator elements 10 pivot about a drive pin 164 for driving rotation of the engagement elements 8 about the pivot pin 177 when the wheel is rotated in a rearward direction as further described below. The drive pin is received in apertures 171 of the actuator elements and oversized apertures 182 of the engagement elements (see FIG. 5).

Figure 3:
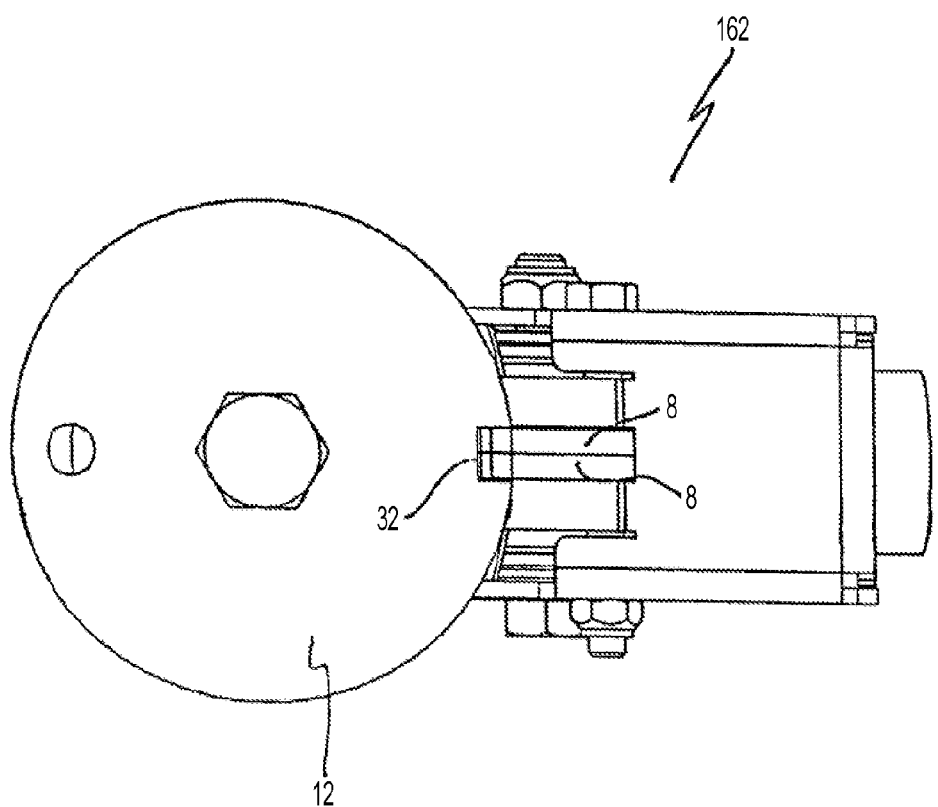
FIG. 3 is a plan view of the wheel assembly of FIG. 1.

As indicated in the FIG. 1, the actuator elements 10 are each provided with an off-set wear plate 172 in contact with the circumferential face 120 of the wheel 2. As can be also seen, each engagement element 8 is engaged in the recess 32 of the locking element 12 such that swivelling of the wheel about the swivel axis of the wheel assembly is restricted. The rear end region 174 of each engagement element is weighted such that the effect of gravity drives the opposite front regions 167 upwardly about pivot pin 164 thereby biasing the engagement elements into engagement with the locking element 12. Rather than weighting the engagement elements to achieve this, suitable biasing means such as springs or elastomeric bands may be utilised to bias the engagement elements into engagement with the locking element 12. A plan view of the wheel assembly 162 showing the side by side relationship of the engagement elements 8 is shown in FIG. 3.

Figure 4:
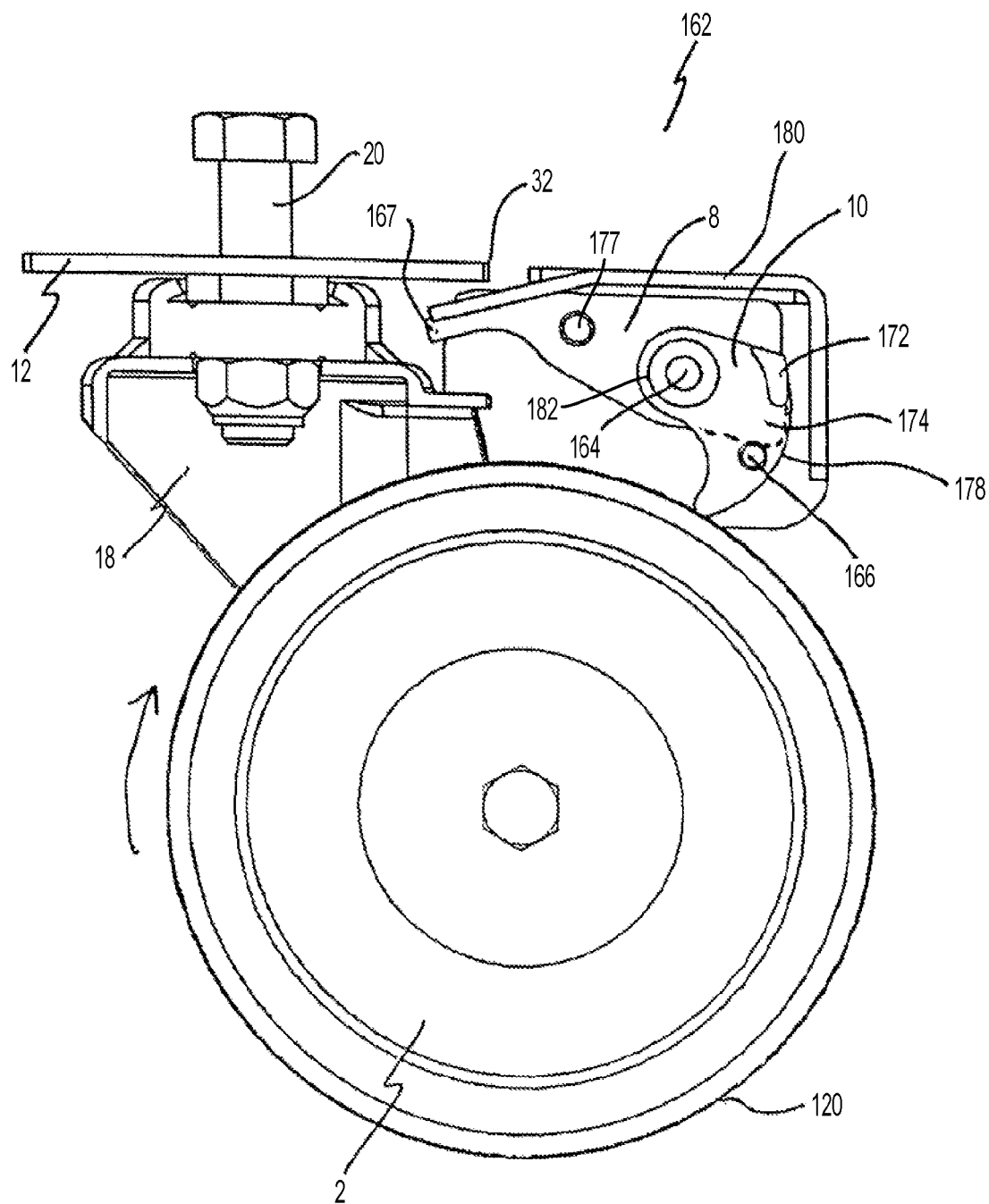
FIG. 4 is a partial side cross-sectional view of the wheel assembly of FIG. 1 when the wheel is rotated in the reverse direction.

When the wheel is rotated in the reverse direction as shown in FIG. 4, the actuator elements 10 are rotated in an anti-clockwise direction about pivot pin 164 by virtue of the frictional contact of the wear plates 172 and bottom surface 178 of each actuator element with the circumferential face 120 of the wheel. As the actuator elements 10 are rotated, the drive pin 164 rises in oversized apertures 182 of the engagement elements 8. With continued rotation of the actuator elements, the drive pin drives rotation of the engagement elements about pivot pin 177 disengaging them from the locking element 12 allowing the wheel to freely swivel about the swivel shaft 20. Rotation of the actuator elements 10 about the drive pin 164, is limited by the contact of the stop pin with the rear end region 174 of the engagement elements.

As will be appreciated, the frictional contact of the actuator elements 10 with the circumferential face 120 of the wheel causes the actuator elements to rotate in the clockwise direction about the drive pin 164 when rotation of the wheel in the forward direction recommences. As the actuator elements rotate about the drive pin, the engagement elements also rotate about the pivot pin 177 in the clockwise direction under the effect of gravity. The clockwise rotation of the engagement element continues until the front end regions 167 of the engagement elements 8 contact the underside surface of the locking element 12. As described above, as the wheel is rotated in the forward direction in use, the wheel bracket 18 swivels about the swivel shaft 20 with continued forward travel of the wheel. The wheel bracket 18 continues to rotate about the swivel shaft 20 until the engagement element 8 closest to the recess 32 of the locking element 12 aligns with the recess 32 and enters the recess under the effect of gravity independently of the other engagement element. With further rotation of the wheel bracket 18 about the swivel shaft 20, the other engagement element 8 then also aligns with the recess 32 and enters the recess under the effect of gravity. Accordingly, the engagement elements are able to rotate relative to one another about the pivot pin 177.

By allowing the independent rotation of the engagement elements 8, the wheel 2 can be locked into the forward direction of travel before the wheel bracket 18 and wheel 2 fully resume their normal position during forward travel of the wheel assembly in use. By narrowing the width of each respective actuator element, engagement in the recess 32 of the locking element may still be achieved even if the wheel bracket is swivelling quickly about the swivel shaft 20, which may not always occur in embodiments having only a single wider engagement element. As will also be understood, the angle of the wheel bracket 18 and wheel 2 at which one of the engagement elements of the present embodiment re-engages the recess of the locking element relative to their normal position during forward travel, may be determined by varying the width of the engagement elements 8.

An exploded view of the wheel assembly 162 is shown in FIG. 5. As indicated above, the diameter of the apertures 182 of the engagement elements 8 which receive the drive pin 164 is greater than that required to accommodate the drive pin. This allows the actuator elements 10 to rotate slightly before the drive pin 164 causes rotation of the engagement elements when the rotation of the wheel reverses from the forward direction to the rearward direction. This slight rotation of the actuator elements bring the bottom surfaces 178 of the actuator elements into contact with the circumferential face of the wheel minimising wear on both the wheel and the bottom surfaces of the actuator elements, and provides for a relatively smooth transition from the contact of the wear plates 172 to the bottom surfaces 178 of the actuator elements with the wheel.

The stop pin 166 is held firmly in aperture 170 of one of the actuator elements. The corresponding aligned aperture 168 of the other actuator element is slightly oversized to provide for a degree of rotational movement about the drive pin 164 by one of the actuator elements arising from variations or deviations in the circumferential face 120 of the wheel 2 without effecting the frictional contact of the other actuator element with the wheel.

Spacers 76 and 78 which receive the drive pin 164 are provided outside of the actuator elements, one to each side, respectively. The dimension between the opposing wings 60 and 62 of the wheel mount are dimensioned such that the drive pin 164 is retained in position and is unable to be removed in the assembled form of the wheel assembly.

The housing 180 is provided with two spaced apart guides 186 defining an elongated space 188. The engagement elements 8 are received in the space and are thereby maintained in position by the guides 186. As can also be seen, a stop 190 is defined on the front end region of each engagement element, which abuts the under side of the locking element preventing further clockwise rotation of the engagement element when the engagement element is engaged in the recess 32 of the locking element 12.

Figure 6:
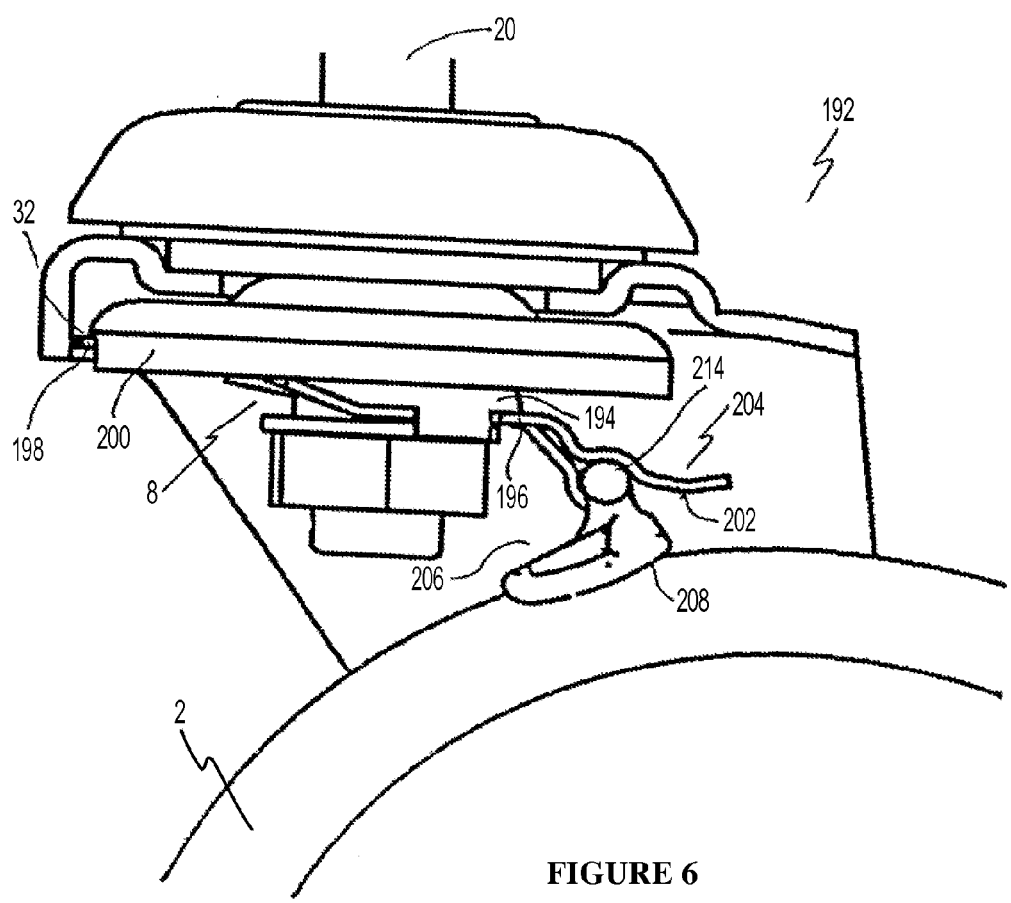
FIG. 6 is a partial side cross-sectional view of a further wheel assembly embodied by the present invention.

A further wheel assembly 192 in which swivelling of the wheel 2 about the swivel axis is restricted when the wheel is rotated in a forward direction but which is substantially freely rotatable about the swivel axis when the wheel is rotated in a reverse direction is shown in FIG. 6. In this embodiment, the engagement element 8 comprises a pivot washer 194 and an elongate spring steel engagement plate 196. The forward end 198 of the engagement plate is received in the recess 32 of the locking element 200 restricting the swivelling of the wheel. The opposite rear end 202 of the engagement plate 196 incorporates a coupling generally indicated by the numeral 204 to which the actuator element 206 is coupled.

Figure 7:
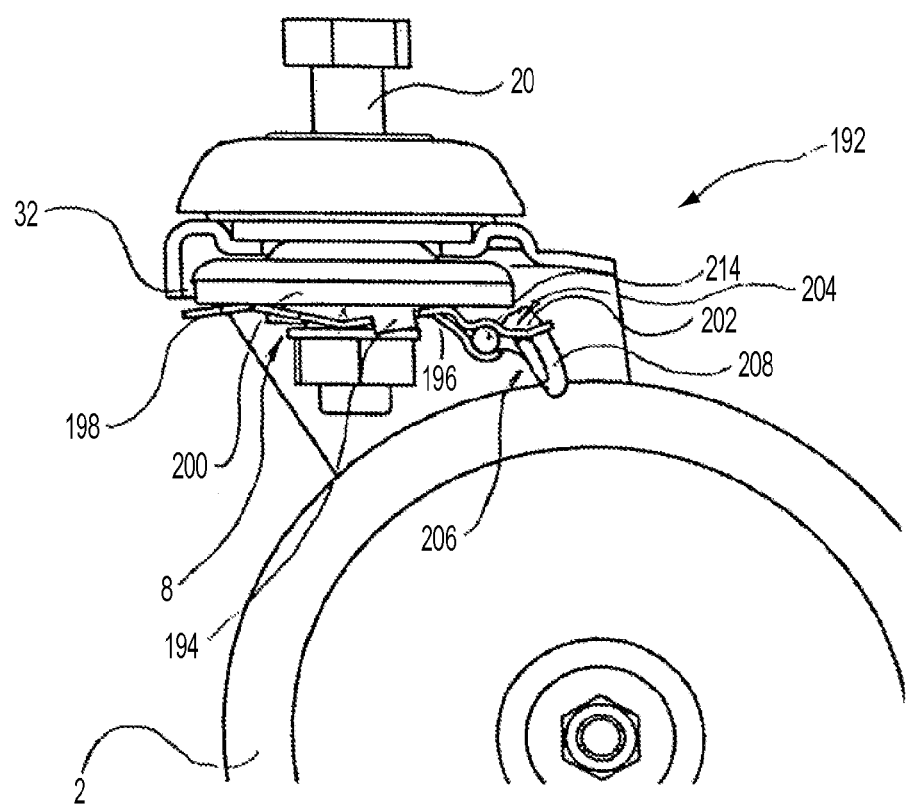
FIG. 7 is a partial side cross-sectional of the wheel assembly of FIG. 6 in which the engagement element of the wheel assembly is disengaged from its wheel mount.

The actuator element 206 comprises a lever arranged to ride on the wheel 2. The lever is integrally formed with a bearing member 214 clasped by the coupling 204 of the engagement plate 196. With rotation of the wheel 2 in the reverse direction, friction between the lever and the wheel causes the lever to travel with rotation of the wheel as the bearing member 214 rotates within coupling 204. As the bearing member 214 rotates, the pressure exerted on the wheel increases under the action of the engagement plate 196. The travel of the lever forces the rear end 202 of the engagement plate upwardly. As a result, the engagement plate 196 pivots about rotational axis X disengaging the forward end 198 of the engagement plate 196 from the locking element 200 as shown in FIG. 7. When forward rotation of the wheel recommences, the movement of the lever is reversed and the engagement plate 196 pivots about the rotational axis X in the opposite direction such that the forward end of the engagement plate re-enters the recess 32 of the locking element 200 when aligned and swivelling of the wheel about the swivel axis is again restricted.

Figure 8:
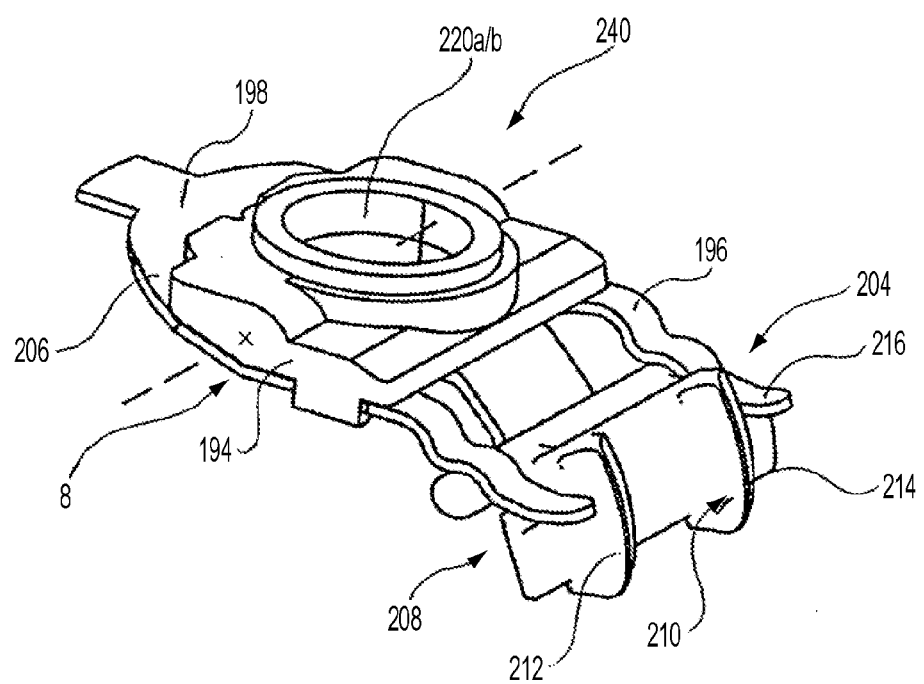
FIG. 8 is a perspective view of the engagement element and the actuator element of the wheel assembly of FIG. 7.

A perspective view of the lever 208 comprising the actuator element 206 and the engagement element 8 of this embodiment when disengaged from the locking element is shown in FIG. 8. The pivot washer 194 and the engagement plate 196 snap fit together and have a centrally defined bore defined by aligned apertures 220a and 220b of the pivot washer 194 and the engagement plate 196 through which the bolt 20 comprising the swivel shaft passes. As also indicated, the lever 208 comprises a cross-piece with spaced apart contact lugs 210. The contact lugs 210 are provided with sloping contact surfaces 212 and 214 which bear against opposite outer peripheral edge regions of the wheel. The underside surface of the cross-piece between the contact lugs does not contact the wheel. The rotation of the lever 208 about the engagement plate 196 is limited by the contact of stops 216 with of the coupling 204 of the engagement plate 196.

Figure 9:
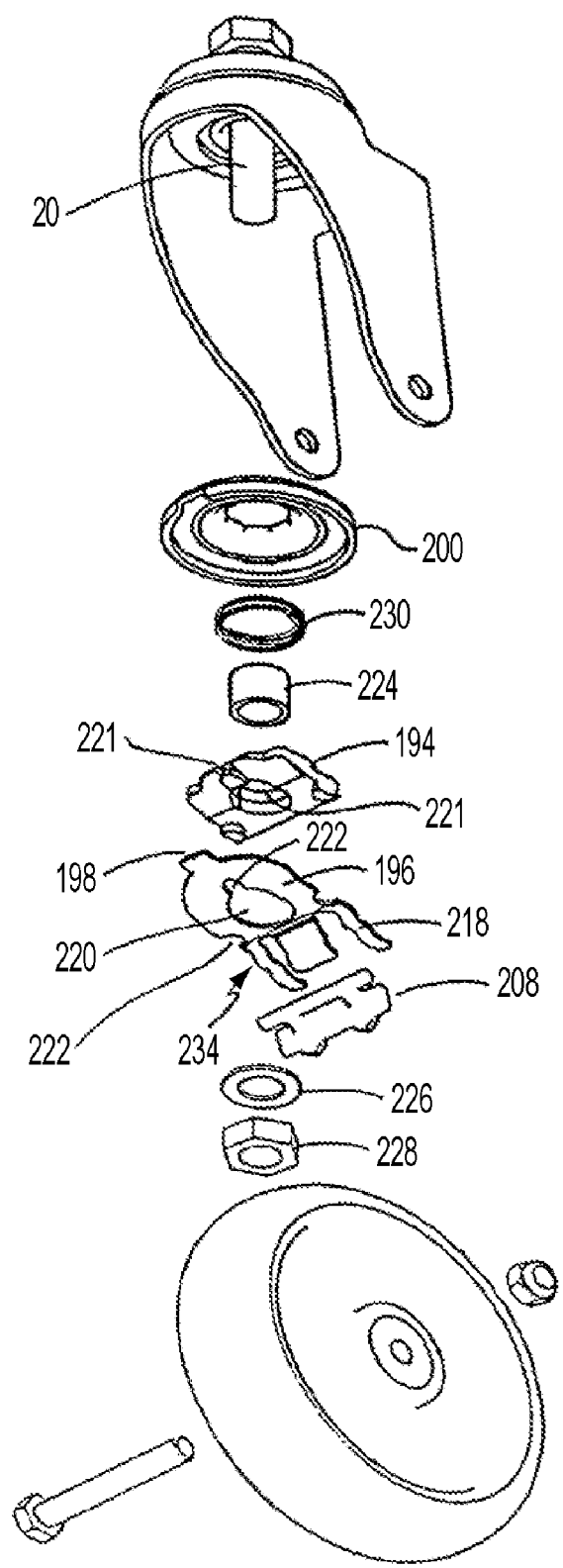
FIG. 9 is an exploded view of the wheel assembly of FIG. 7.

As shown more clearly in FIG. 9, the pivot washer 194 is provided with a plurality of tabs 221 which hold the pivot washer 194 and the engagement plate 196 together when pressed fitted into corresponding recesses 222 defined in the engagement plate 196. A spacer 224 that receives the bolt 20 and is located within the central bore of the engagement element 8 is seated on a washer 226 in the assembled configuration. The assembly is held together by the engagement of lock nut 228 with the bolt. A compression spring 230 is positioned between the locking element 200 and the pivot washer 194 to gently bias the engagement plate 196 into engagement with the locking element and dampen any play between the washer 194 and the locking element 200. While a spring 230 is shown, any other biasing means for biasing the engagement element 8 into engagement with the locking element 200 may be used. For instance, the pivot washer 194 could be provided with one or more rearwardly sloping resilient extensions which press against the underside of the locking element 200. The forward and rear sides of the wall of the pivot washer 194 defining aperture are sloped outwardly to enable the limited pivoting of the engagement element 8 about the pivot axis X.

To facilitate this rotational movement about pivot axis X, the aperture 220a defined in the engagement plate 196 is oversized. Typically, the engagement element 8 will pivot ±12° about pivot axis X.

Figure 10:
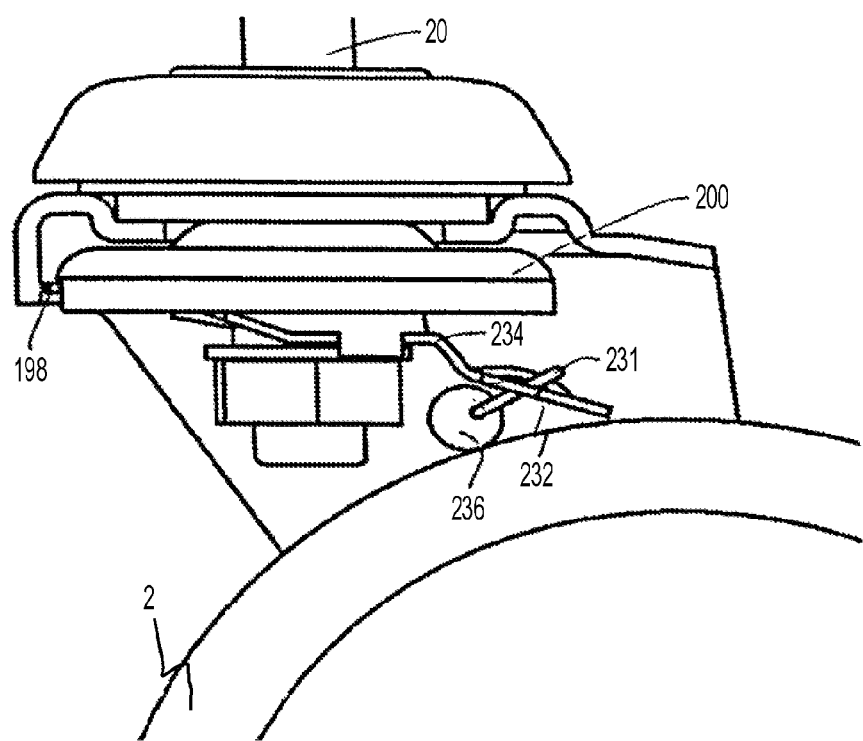
FIG. 10 is a partial cross-sectional view of a yet further wheel assembly embodied by the present invention.

A yet further wheel assembly embodied by the invention is illustrated in FIG. 10. This embodiment differs from that of FIG. 6 in that the actuator element includes a roller 236 which cooperates with the coupling 232 of the engagement plate 234. The engagement plate 234 and coupling 232 presses the roller 236 against the outer circumferential periphery of the wheel 2.

With rotation of the wheel in the forward direction, the roller 236 rests lightly on the wheel. When the wheel is rotated in the reverse direction, the friction between the roller 236 and the wheel 2 causes the roller to slide relative to the coupling 232 and ride on the wheel 2 about the wheels rotational axis. As the roller 236 contacts the coupling 232, the pressure of the roller 236 against the wheel 2 is increased under the action of the engagement element thus increasing the friction between the wheel 2 and the roller 236.

Figure 11:
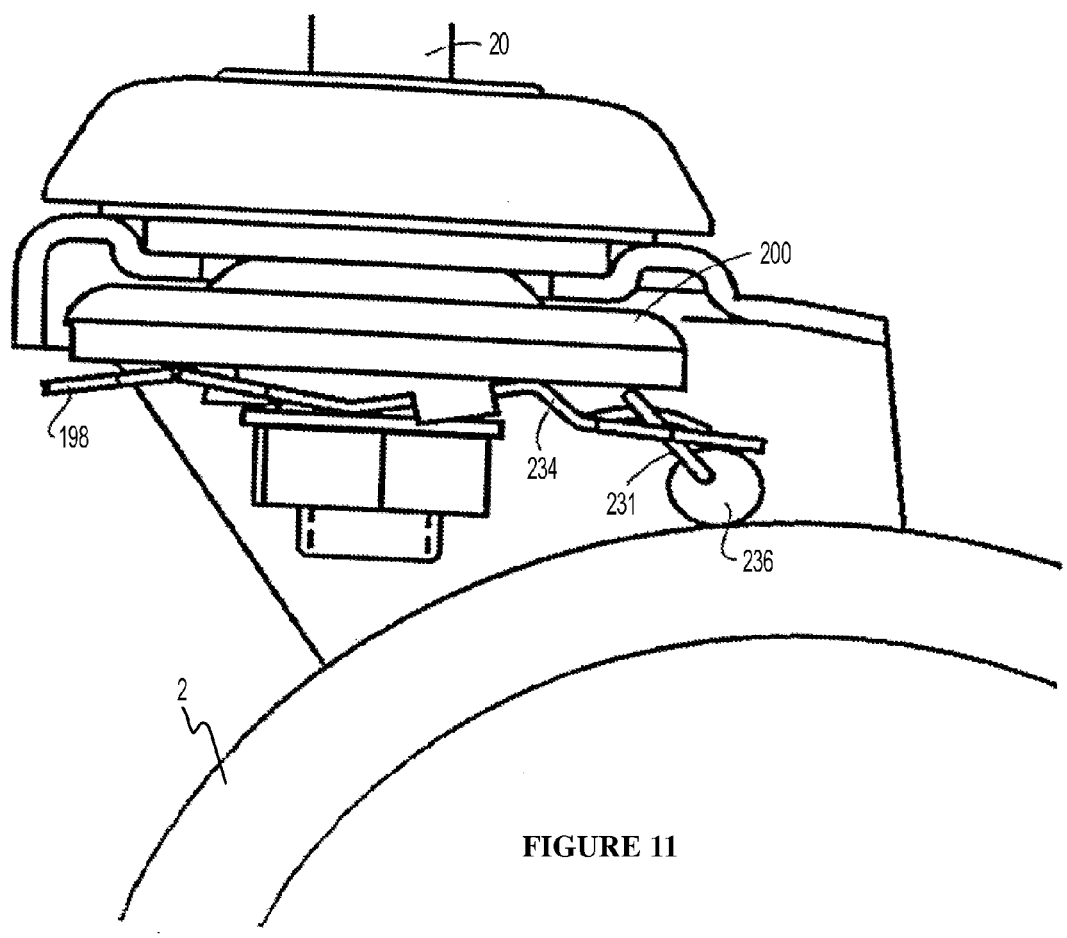
FIG. 11 is a partial cross-sectional view of the wheel assembly of FIG. 10 in which the engagement element of the wheel assembly is disengaged from its wheel mount.
Figure 12:
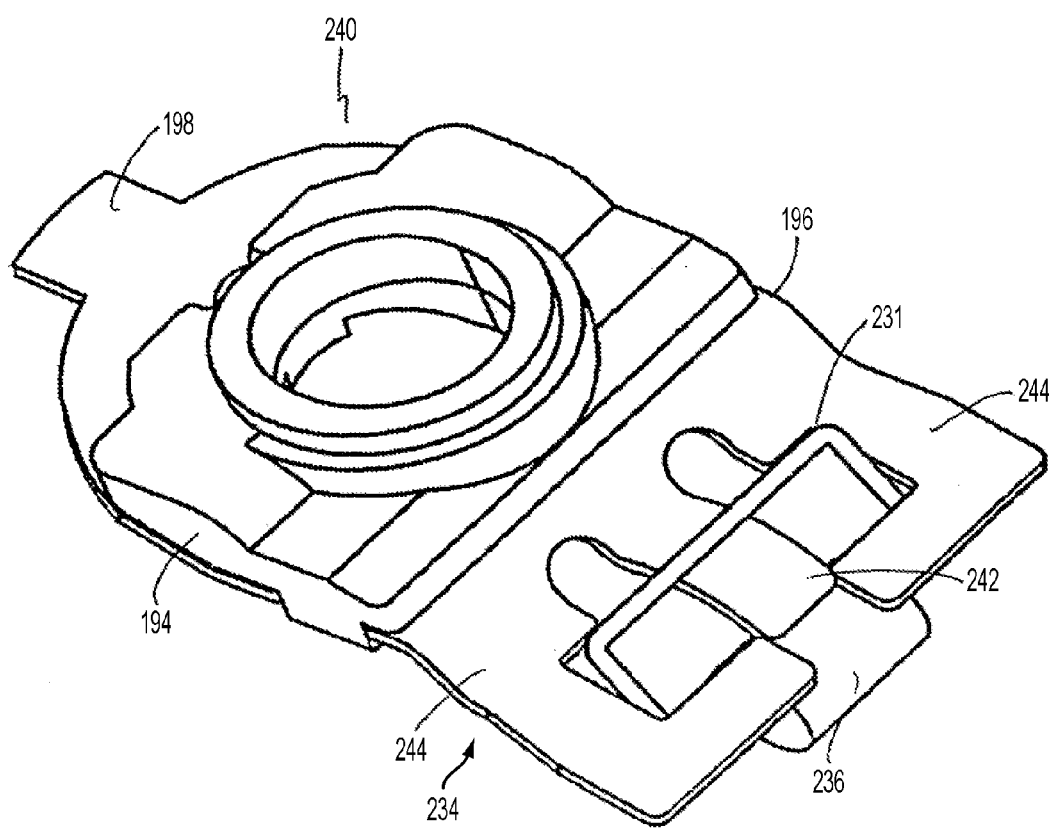
FIG. 12 is a perspective view of the engagement element and the actuator element of the wheel assembly of FIG. 11.

With further travel of the roller 236 the rear end of the engagement plate 234 is forced upwardly. As with the wheel assembly shown in FIG. 6, this forces the engagement plate 234 to pivot about axis of rotation X and the forward end 198 of the engagement plate 234 to disengage from the locking element 200 as shown in FIG. 11. A perspective view of the actuator element and the engagement element 240 of this embodiment when the engagement plate 234 is detached from the locking element is shown in FIG. 12. As can be seen, the coupling 232 of the engagement plate 234 comprises a central arm 242 over which the coupling arm 232 of the actuator element is received. The coupling 232 is configured such that the actuator element is held captive on the engagement plate as in the embodiment shown in FIG. 6.

Figure 13:
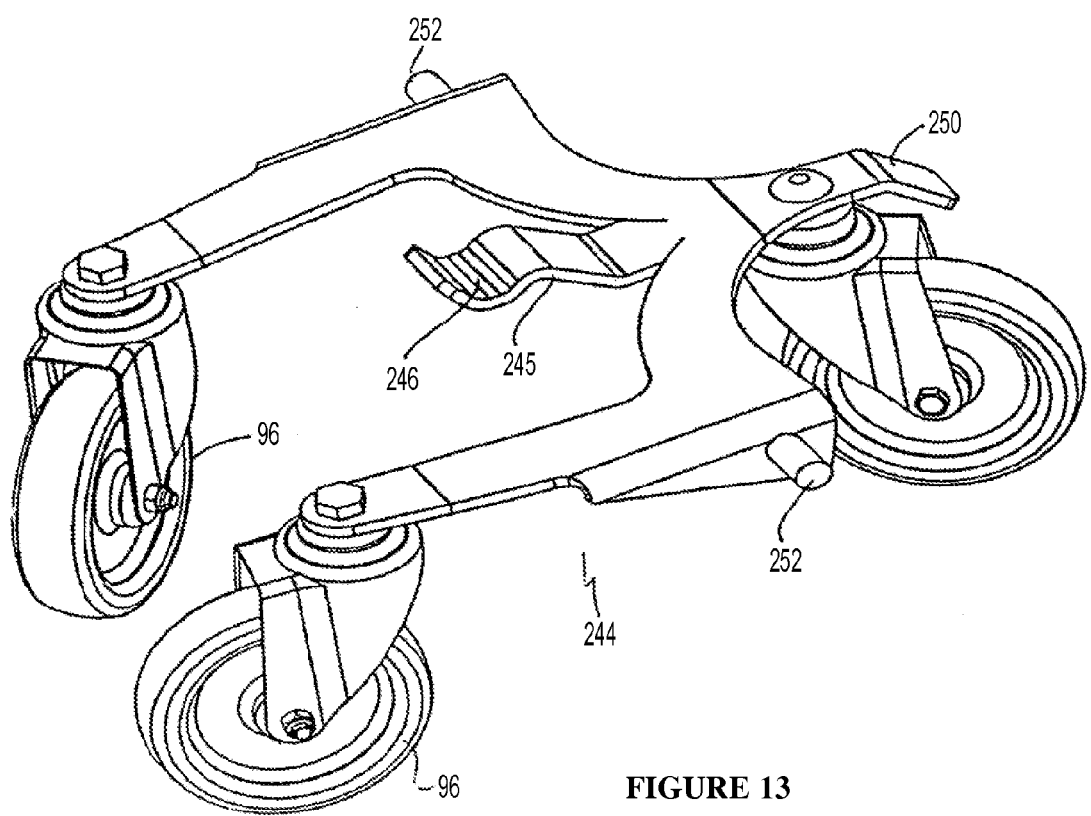
FIG. 13 is a perspective view of a rocker bracket of a trolley embodied by the invention.
Figure 14:
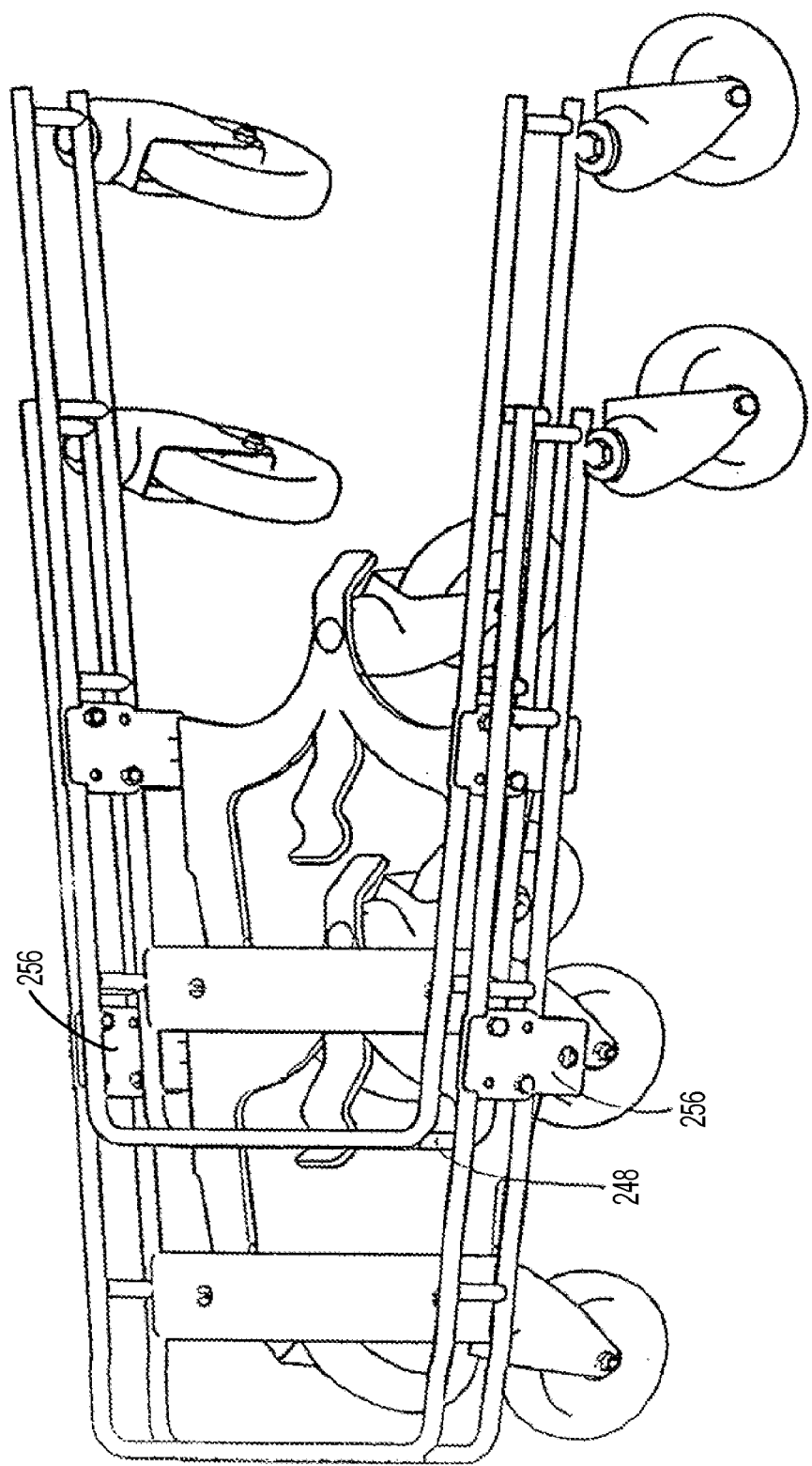
FIG. 14 is a perspective view of two shopping trolley bases nested together.

Turning now to FIG. 13, there is shown a pivotally articulated support 244 for being pivotally mounted on the base of a shopping trolley. This support 244 differs from that shown in FIG. 2A to FIG. 2D in that it is provided with a nesting member 245 that projects lengthwise along the trolley frame. As illustrated in FIG. 14, the nesting member comprises a cradle 246 for receiving a cross-member 248 of the base of the frame of a further shopping trolley when the trolleys are nested together. The reception of the cross-member 248 in the cradle 246 acts to retain the trolleys nested together.

A deflector element 250 (see FIG. 13) is also provided that projects rearwardly downwards. The deflector element 250 deflects the cross-member 248 of the rearward trolley over the articulated support 244. With continued progression of the further trolley into the first trolley, the cross-member is driven into the cradle 246 of the first trolley. Importantly, all the forward castor wheels (including the wheel/castor assembly) of the further trolley are raised from the ground. Therefore, in a train of nested trolleys it is only the rearward castors of the rearmost trolley that touch the ground. This feature improves the manoeuvrability of the train of nested trolleys. The support also promotes close nesting of the trolleys by raising a front portion of a rearward nested trolley relative to its forward neighbour. The support 244 also further assists to inhibit inadvertent separation of the trolleys from the nested configuration.

The articulated support 244 is provided with pivot pins 252 received in apertures defined in trolley brackets 256 clamped to the base 84 of the trolley frame (see FIG. 14). Each of trolley brackets 256 comprise a pair of plate members that clamp the trolley frame between them, and which are held together by bolts. The trolley brackets can be readily fitted to shopping trolleys of the type shown enabling the trolleys to be retrofitted with the support 244. Any suitable conventional castor wheels may be mounted to the rocker bracket although it is preferred that at least the rear castor wheel on the bracket comprise a wheel of the invention.

It will be appreciated by persons skilled to the art that numerous variations and/or modifications may be made to the invention as shown in the specific embodiments without departing from the spirit or scope of the invention as broadly described. For example, the location of the wheel assembly on the rocker bracket 90 maybe changed and various other geometries of the rocker bracket may be utilised. The present embodiments are, therefore, to be considered in all respects as illustrative and not restrictive.

The invention claimed is:

1. A wheel assembly comprising:
 a wheel bracket, and a wheel rotationally mounted thereto;
 a swivel shaft, the wheel bracket being mounted to the shaft to swivel, together with the wheel, about the shaft;
 a locking element mounted to the swivel shaft;
 an engagement element arranged for releasable engagement with the locking element to restrict swivelling of the wheel bracket about the swivel shaft; and
 at least one actuator element arranged for contact with a peripheral surface of the wheel and operatively coupled with the engagement element whereby, while the engagement element is fully engaged with the locking element, rotation of the wheel in one direction only urges the actuator element into increased pressing engagement with the wheel for disengagement of the engagement element from the locking element to permit swivelling of the wheel bracket together with the wheel, the engagement and actuator elements also being arranged with further rotation of the wheel in said one direction to decrease or maintain constant said pressing engagement element following said disengagement.

2. A wheel assembly according to claim 1 wherein the actuator element is operatively coupled with a coupling portion of the engagement element whereby the pressing engagement of the actuator element with the wheel drives the coupling portion away from the peripheral surface of the wheel.

3. A wheel assembly according to claim 2 further comprising a drive pin for coupling to the coupling portion of the engagement element and driving the engagement element about a pivot axis of the engagement element, into and from engagement with the locking element, the at least one actuator being rotatably mounted on the drive pin for driving rotation of the drive pin and thereby the engagement element about the pivot axis in at least one direction with rotation of the actuator element about the drive pin.

4. A wheel assembly according to claim 1 wherein the actuator element includes a cam member.

5. A wheel assembly according to claim 1 wherein the engagement and actuator elements are arranged so that rotation of the wheel in another direction provides reduced pressing engagement of the actuator element with the wheel.

6. A wheel assembly according to claim 1 wherein the engagement element includes an aperture through which the swivel shaft passes, and the engagement element pivots about a pivot axis oriented generally transverse to said shaft.

7. A wheel assembly according to claim 6 wherein the actuator element includes a bearing member clasped or otherwise engaged by the coupling portion of the engagement element distant from the transverse pivot axis.

8. A wheel assembly according to claim 6 wherein the actuator element includes a roller cooperating with an underside surface of the coupling portion, said surface being distant from the transverse pivot axis.

9. A wheel assembly according to claim 1 wherein the engagement element pivots about the wheel bracket.

10. A wheel assembly according to claim 1 wherein the engagement element is configured to bias into engagement with the locking element.

11. A wheel assembly according to claim 1 further comprising biasing means arranged to bias the engagement element into engagement with the locking element.

12. A wheel assembly according to claim 1 wherein the engagement element has an engagement formation defined at one end region for engagement with the locking element.

13. A wheel assembly according to claim 1 wherein the actuator element includes a lever member.

14. A wheel assembly according to claim 1 wherein the actuator element includes a roller member.

15. A wheel assembly according to claim 1 wherein the wheel is one of a pair of wheels and said at least one actuator element is a pair of actuator elements being dedicated to respective wheels of the pair of wheels.

16. A wheel assembly according to claim 1 further comprising one or more other engagement elements arranged in side by side relationship relative to each other and said engagement element, said engagement element and the other engagement elements being arranged for releasably engaging the locking element to restrict swivelling of the wheel bracket together with the wheel about the swivel shaft.

17. A wheel assembly according to claim 1 adapted for being fitted to a trolley.

18. A wheel assembly according to claim 17 wherein the trolley is selected from the group consisting of shopping trolleys, bed and cot trolleys, hospital trolleys, trolley carts and wagons, patient lifters and serving trolleys.

19. A wheel assembly according to claim 1 wherein the locking element is rotatable about the swivel shaft within a predetermined limit up to about ±12°.

20. A trolley incorporating a wheel assembly, according to claim 1, for contact with a ground surface for facilitating travel of the trolley.

21. A trolley according to claim 20 wherein the trolley is selected from the group consisting of shopping trolleys, bed and cot trolleys, trolley carts and wagons, and serving trolleys.

22. A trolley according to claim 21 wherein the trolley is a shopping trolley, or a bed or cot trolley.

23. A wheel assembly comprising:
a wheel bracket, and a wheel rotationally mounted thereto;
a swivel shaft, the wheel bracket being mounted to the shaft to swivel, together with the wheel, about the shaft;
a locking element mounted to the swivel shaft;
an engagement element being arranged for releasable engagement with the locking element to restrict swivelling of the wheel bracket about the swivel shaft; and
at least one actuator element arranged for contact with a peripheral surface of the wheel and being operatively coupled to a coupling portion of the engagement element whereby rotation of the wheel in one direction only urges the actuator element into increased pressing engagement with the wheel driving the coupling portion of the engagement element away from the peripheral surface of the wheel for disengagement of the engagement element from the locking element to permit swivelling of the wheel bracket together with the wheel, and rotation of the wheel in another direction reduces said pressing engagement.

24. A wheel assembly comprising:
a wheel bracket, and a wheel rotationally mounted thereto;
a swivel shaft, the wheel bracket being mounted to the shaft to swivel, together with the wheel, about the shaft;
a locking element mounted to the swivel shaft;
an engagement element arranged for releasable engagement with the locking element to restrict swivelling of the wheel bracket about the swivel shaft; and
at least one cam member arranged for contact with a peripheral surface of the wheel and being operatively coupled to the engagement element whereby rotation of the wheel in one direction only urges the cam member into increased pressing engagement with the wheel for disengagement of the engagement element from the locking element to permit swivelling of the wheel bracket together with the wheel, and rotation of the wheel in another direction reduces said pressing engagement.

* * * * *